(12) United States Patent
Mudulodu et al.

(10) Patent No.: US 7,929,595 B2
(45) Date of Patent: *Apr. 19, 2011

(54) ESTIMATING FREQUENCY OFFSET AT A SUBSCRIBER STATION RECEIVER

(75) Inventors: Sriram Mudulodu, Santa Clara, CA (US); Harold Artes, Santa Clara, CA (US); Bertrand Hochwald, Santa Clara, CA (US); Guojie Dong, Santa Clara, CA (US); Robert G. Lorenz, Santa Clara, CA (US); Javvadi Varaprasad, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 665 days.

This patent is subject to a terminal disclaimer.

(21) Appl. No.: 11/998,240

(22) Filed: Nov. 29, 2007

(65) Prior Publication Data

US 2009/0092199 A1 Apr. 9, 2009

Related U.S. Application Data

(60) Provisional application No. 60/998,010, filed on Oct. 5, 2007.

(51) Int. Cl.
*H04L 27/18* (2006.01)
(52) U.S. Cl. ........................................ 375/222; 375/220
(58) Field of Classification Search .................. 375/260, 375/219, 220, 222; 370/319, 347
See application file for complete search history.

(56) References Cited

U.S. PATENT DOCUMENTS

| 2003/0154025 | A1 | 8/2003 | Fuchs et al. |
| 2004/0014480 | A1 | 1/2004 | Liu et al. |
| 2004/0202234 | A1 | 10/2004 | Wang |
| 2005/0122895 | A1 | 6/2005 | Zhou et al. |
| 2007/0142067 | A1* | 6/2007 | Cheng et al. ................... 455/512 |
| 2007/0230388 | A1* | 10/2007 | Li et al. ........................ 370/313 |
| 2007/0263752 | A1 | 11/2007 | Guey et al. |
| 2008/0205451 | A1* | 8/2008 | Ramesh et al. ............... 370/491 |
| 2009/0074045 | A1* | 3/2009 | Mudulodu et al. ............. 375/226 |
| 2009/0141832 | A1* | 6/2009 | Mudulodu et al. ............. 375/329 |

* cited by examiner

*Primary Examiner* — Emmanuel Bayard
(74) *Attorney, Agent, or Firm* — McAndrews, Held & Malloy, Ltd.

(57) ABSTRACT

A method and system of estimating frequency offset at a subscriber station is disclosed. One method includes the subscriber station receiving a composite signal, wherein the composite signal includes multi-carrier signals transmitted from a plurality of base stations. The subscriber station selects a first pair of multi-carrier symbols of the composite signal, wherein each multi-carrier symbol of the first pair of multi-carrier symbols includes a pilot sub-carrier having a common sub-carrier index. The subscriber station selects a second pair of multi-carrier symbols of the composite signal, the second pair having different symbol indices than the first pair, but having a same symbol index separation, wherein each of the multi-carrier symbols of the second pair of multi-carrier symbols includes a pilot sub-carrier having a second common sub-carrier index. The subscriber station estimates a phase based on a first sum of complex conjugate products between received symbols on the pilot sub-carriers of the first pair of multi-carrier symbols, and/or based on a second sum of complex conjugate products between received symbols on the pilot sub-carriers of the second pair of multi-carrier symbols. The subscriber station provides the phase to a filter of a frequency tracking loop of the subscriber station.

28 Claims, 6 Drawing Sheets

The subscriber station receiving a composite signal, wherein the composite signal includes multi-carrier signals transmitted from a plurality of base stations
610

The subscriber station selecting a first pair of multi-carrier symbols of the composite signal, wherein each multi-carrier symbol of the first pair of multi-carrier symbols includes at least a pilot sub-carrier having a common sub-carrier index. That is, each multi-carrier symbols of the first pair of multi-carrier symbols includes one or more pilot sub-carrier that corresponds (has the same sub-carrier index) with a pilot sub-carrier of the other multi-carrier symbol of the first pair of multi-carrier symbols
620

The subscriber station selecting a second pair of multi-carrier symbols of the composite signal, the second pair having different symbol indices than the first pair, but having a same symbol index separation, each of the multi-carrier symbols of the second pair of multi-carrier symbols including at least a pilot sub-carrier having a second common sub-carrier index
630

The subscriber station estimating at least one phase based on a first sum of complex conjugate products between received symbols on the pilot sub-carriers of the first pair of multi-carrier symbols, and based on a second sum of complex conjugate products between received symbols on the pilot sub-carriers of the second pair of multi-carrier symbols
640

The subscriber station providing the at least one phase to a filter of a frequency tracking loop
650

FIGURE 6

ESTIMATING FREQUENCY OFFSET AT A SUBSCRIBER STATION RECEIVER

CROSS-REFERENCE TO RELATED APPLICATION

This application claims the benefit of U.S. Provisional Application Patent Application No. 60/998,010, filed on Oct. 5, 2007, which is incorporated by reference in its entirety herein.

FIELD OF EMBODIMENTS

The described embodiments relate generally to wireless communication networks and more specifically to methods of estimating frequency offset at a subscriber station receiver.

BACKGROUND

Wireless networks are gaining popularity because wireless infrastructures are typically easier and less expensive to deploy than wired networks. However, wireless networks can be susceptible to environmental conditions, interference and self-interference. A popular wireless network implementation uses base stations that communicate with wireless user devices that are located within cells formed by the base stations.

Carrier frequencies at the transmitter and the receiver are generally derived from different sources. For example, in 802.16e standard systems, the base stations (BS) derive their carrier frequency from a GPS (global positioning system) clock and the subscriber station (SS) typically derives its carrier frequency from a crystal oscillator. The carrier frequencies of the two devices can be as much as tens of KHz apart. The difference between the transmitter frequency and receiver frequency is referred to as the frequency offset.

A large frequency offset error degrades the performance of the receiver. The smaller the frequency offset, the better the performance of the receiver. Better performance translates to increased data rates, increase coverage, and decrease cost per user.

The performance of the frequency offset estimation and tracking must be adequate even in the presence of interference. Generally, there are two main additive impairments at the receiver in a wireless communication system. The impairments include both interference and noise. The interference can come from devices inside and outside of the system. The noise is typically includes Additive White Gaussian Noise (AWGN) or thermal noise. Most wireless systems are interference limited, meaning the effect of interference dominates that of additive noise at the receiver. Frequency offset estimation and tracking algorithms can be used to reduce the effects of interference and noise.

There is a need for method and system for estimating frequency offset between a wireless base station and a wireless terminal in the presence of interference.

SUMMARY

An embodiment includes a method of estimating frequency offset at a subscriber station. The method includes the subscriber station receiving a signal. The subscriber station selects a first pair of multi-carrier symbols of the signal, wherein each multi-carrier symbol of the first pair of multi-carrier symbols includes at least one pilot sub-carrier having a common sub-carrier index. The subscriber station selects a second pair of multi-carrier symbols of the composite signal, wherein at least one of the multi-carrier symbols of the second pair has a different symbol index than the first pair, and wherein each of the multi-carrier symbols of the second pair of multi-carrier symbols includes at least one pilot sub-carrier having a second common sub-carrier index. A phase is estimated based on a complex conjugate product between channel estimates of at least one of the first pair multi-carrier symbols and the second pair of multi-carrier symbols. The subscriber station provides the at least one phase to a filter of a frequency tracking loop.

Another embodiment includes another method of estimating frequency offset at a subscriber station. The method includes the subscriber station receiving a composite signal, wherein the composite signal includes multi-carrier signals transmitted from a plurality of base stations. The subscriber station selects a first pair of multi-carrier symbols of the composite signal, wherein each multi-carrier symbol of the first pair of multi-carrier symbols includes a pilot sub-carrier having a common sub-carrier index. The subscriber station selects a second pair of multi-carrier symbols of the composite signal, the second pair having at least one different symbol index than the first pair, wherein each of the multi-carrier symbols of the second pair of multi-carrier symbols includes a pilot sub-carrier having a second common sub-carrier index. The subscriber station estimates a phase based on a first sum of complex conjugate products between received symbols on the pilot sub-carriers of the first pair of multi-carrier symbols, and/or based on a second sum of complex conjugate products between received symbols on the pilot sub-carriers of the second pair of multi-carrier symbols. The subscriber station provides the phase to a filter of a frequency tracking loop of the subscriber station.

Another embodiment includes another method of estimating frequency offset at a subscriber station. The method includes the subscriber station receiving a signal. The subscriber station selects a first pair of multi-carrier symbols of the signal, wherein each multi-carrier symbol of the first pair of multi-carrier symbols includes at least one pilot sub-carrier having a common sub-carrier index. The subscriber station selects a second pair of multi-carrier symbols of the composite signal, the second pair having at least one different sub-carrier index than the first pair, and selected from a different frame, and wherein each of the multi-carrier symbols of the second pair of multi-carrier symbols includes at least one pilot sub-carrier having a second common sub-carrier index. A phase is estimated based on a complex conjugate product between channel estimates of at least one of the first pair multi-carrier symbols and the second pair of multi-carrier symbols. The subscriber station provides the at least one phase to a filter of a frequency tracking loop.

Other aspects and advantages of the described embodiments will become apparent from the following detailed description, taken in conjunction with the accompanying drawings, illustrating by way of example the principles of the described embodiments.

BRIEF DESCRIPTION OF DRAWINGS

A more complete appreciation of the described embodiments is provided by reference to the following detailed description when considered in conjunction with the accompanying drawings in which reference symbols indicate the same or similar components.

FIG. 6 is a flow chart that includes another example of steps of a method of estimating frequency offset at a subscriber station.

DETAILED DESCRIPTION

Figure 1:
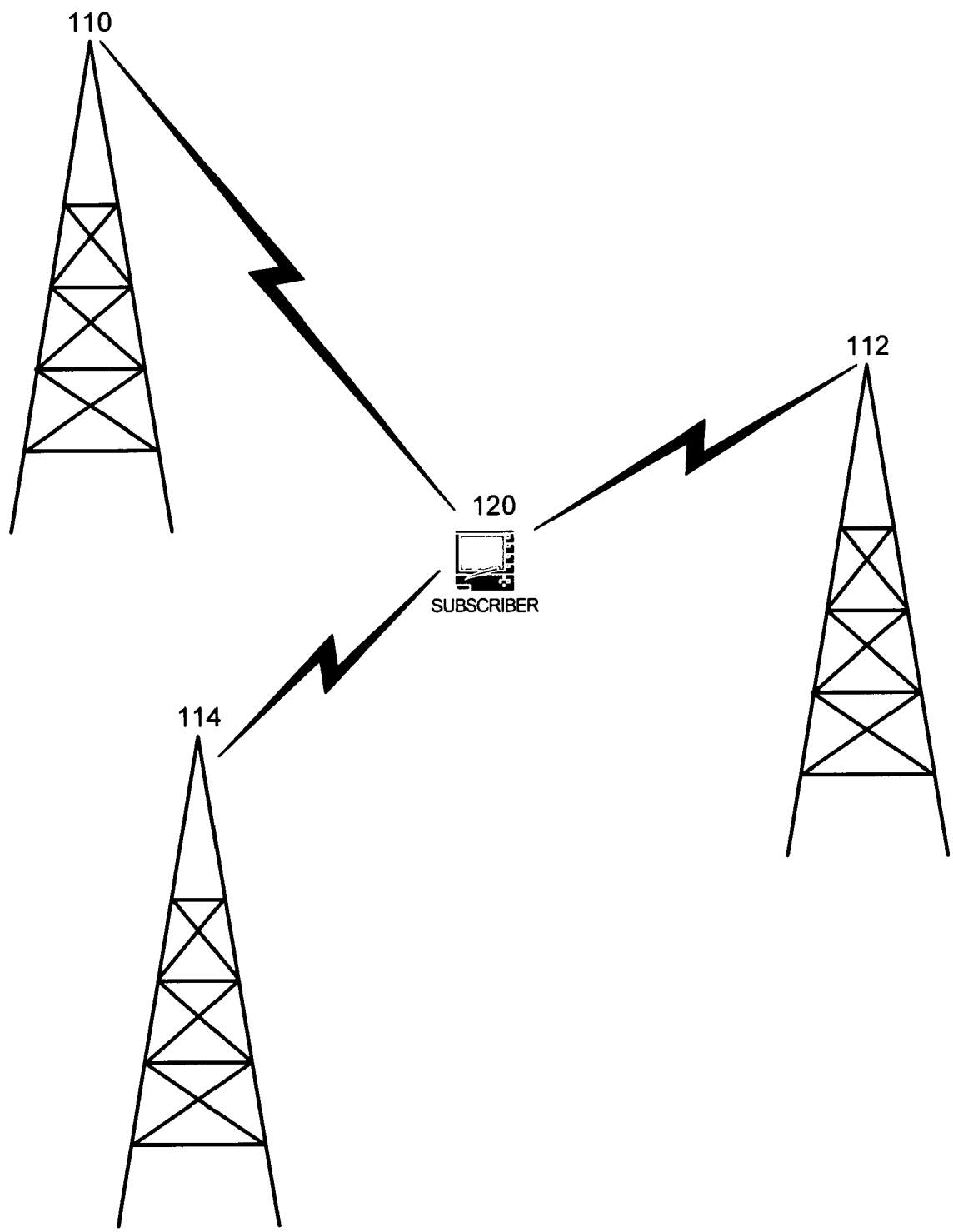
FIG. 1 illustrates an example of a wireless communication system that includes multiple synchronized base stations.

Before describing embodiments, it is to be observed that the embodiments provide examples of methods of estimating frequency offset between a subscriber station and at least one base station of a wireless system. The frequency offset estimation can be used to improve performance of wireless communication of the system. The described embodiments can provide estimates over time, making the estimates adaptive to variations in the frequency error offset over time.

Accordingly, the apparatus components and method steps have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

It is to be understood that the term symbol can be used having different meanings. The terms multi-carrier symbol and orthogonal frequency division multiplexing (OFDM) symbol are used interchangeably. It is to be understood that an OFDM symbol is a type of multi-carrier symbol. The word symbol can also be used having the meaning of a modulation symbol which is transmitted on a sub-carrier. The term symbol can also be used to denote the received signal on a sub-carrier, in which case can be referred to as a received symbol.

The described embodiments include the selection of pairs of multi-carrier symbols to be used for estimating phases for a filter of a frequency tracking loop of a receiver. Ideally, all available pairs are used to estimate the phases. However, this results in a computationally difficult system that requires large amounts of processing. Therefore, the number of pairs must be less than all of the available pairs. Once limited in the number of pairs that can be used, in most situations, it is better to select pairs that with diverse time and frequency locations within transmission frames.

FIG. 1 illustrates an example of a wireless communication system that includes multiple synchronized base stations 110, 112, 114. A wireless subscriber station 120 receives wireless transmission signals from one or more of the base stations 110, 112, 114. The wireless communication system can include various subscriber stations, such as, mobile phones, personal computers, laptops or personal digital assistants (PDAs), and a plurality of base stations. One or more subscriber stations can be located in a service area corresponding to one or more base stations.

One embodiment of the wireless transmission signals of the base stations 110, 112, 114 include pilot sub-carriers that can be used to estimate the frequency offset between at least one of the base stations 110, 112, 114 and the wireless subscriber station 120. As will be described, pilot sub-carriers transmitted from more than one base station 110, 112, 114 can be received by the subscriber station 120. Pilot symbols are transmitted on the pilot sub-carriers. The pilot symbols transmitted by one base station can be completely different from the pilot symbols transmitted by a different base station. The received symbols on selected pilot sub-carriers can be processed to provide an estimate of the frequency offset between the subscriber station 120 and the base stations 110, 112, 114.

As will be described, the processing includes estimating one or more phases based on complex conjugate products between channel estimates (as will be described, the channel estimates can include time domain channel estimates and/or frequency domain channel estimates) of multiple pairs of multi-carrier symbols. The pairs of multi-carrier symbols vary from one pair to another. As will be described, at least one of the multi-carrier symbols of each pair includes a different symbol index than the multi-carrier symbols of another pair. Different pairs of the multi-carrier symbols used for frequency offset estimation can be from a common (same) frame, or different frames. The variations provide diversity (time and/or frequency) in phase estimates, making the phase estimates adaptive to frequency offset variations over time. The one or more phase estimates can be used to provide at least some control of the frequency tracking loop. The phase estimates represent frequency offset errors between a receiver and at least one transmitter.

Figure 2:
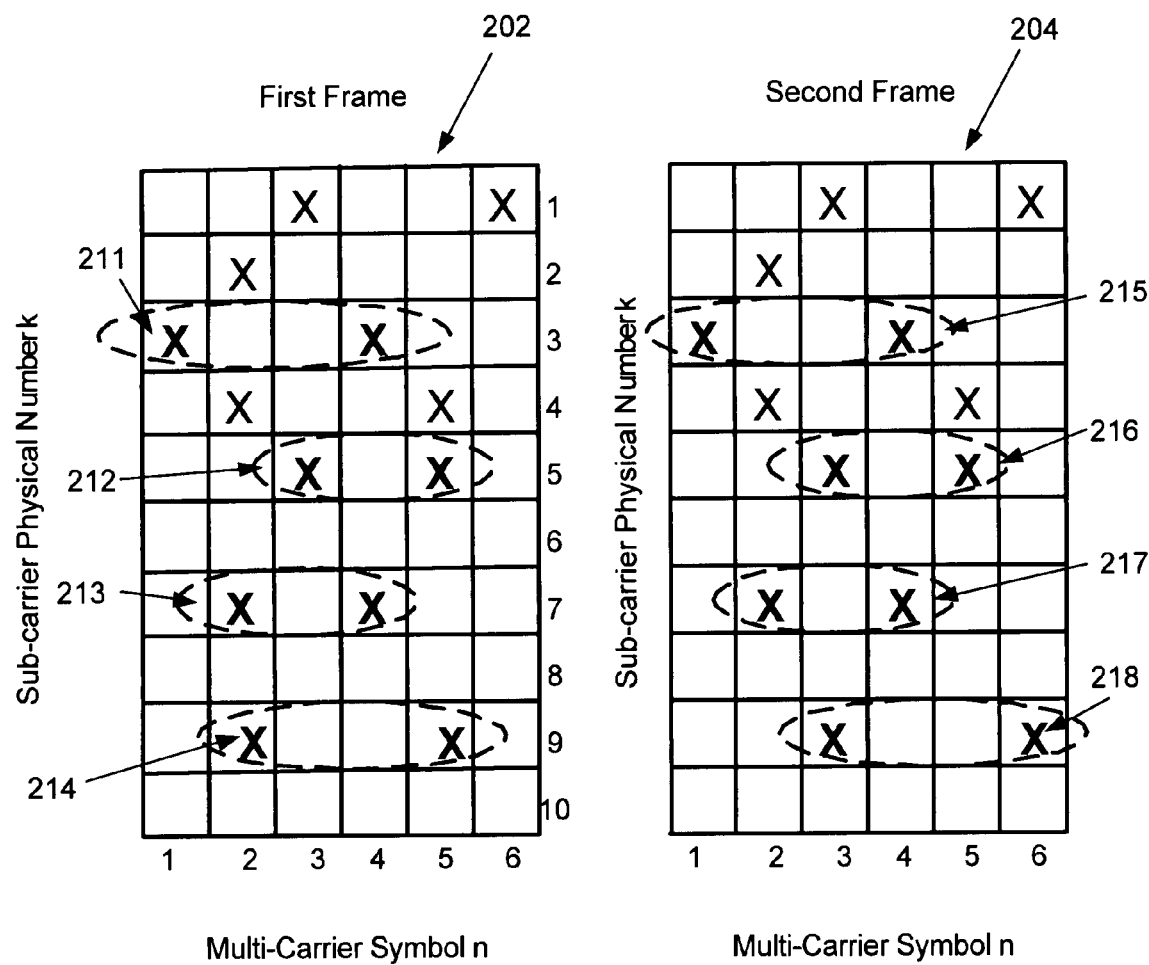
FIG. 2 illustrates an example of two downlink sub-frames of transmission between a base station and a subscriber station, and shows various first and second multi-carrier symbol pairs.

FIG. 2 illustrates an example of a portion of a downlink sub-frame of transmission between a base station (transmitter) and a subscriber station (receiver). The downlink sub-frame includes pilot sub-carriers located at some of the sub-carriers of the multi-carrier symbols. Within the downlink sub-frame, a sub-carrier index can be designated by k and the multi-carrier symbols index can be designated by n. FIG. 2 shows 10 sub-carriers (that is, k varies from 1 to 10) and 6 multi-carrier symbols (that is, n varies from 1 to 6). However, it is to be understood that the described embodiments are not limited to any particular ranges of values of k and n.

The subscriber station receives, for example, downlink sub-frames 202, 204 of transmission as shown in FIG. 2. The received signal generally includes signals (also referred to as a composite signal) from multiple base stations. Typically, one of the base stations is designated as a serving base station, and the other base stations are interfering base stations. The subscriber selects at least a first pair of multi-carrier symbols of the composite signal. The first pair includes two multi-carrier symbols, wherein each multi-carrier symbol includes at least one pilot sub-carrier having a common sub-carrier index. The subscriber station selects a second pair of multi-carrier symbols of the composite signal. The second pair also includes two multi-carrier symbols, and at least one multi-carrier symbol of the second pair has at least one different symbol index than the multi-carrier symbols of the first pair. Each of the multi-carrier symbols of the second pair of multi-carrier symbols includes at least a pilot sub-carrier having a second common sub-carrier index.

The subscriber can select any number of pairs of multi-carrier symbols. However, several of the described embodiments only include two pairs of multi-carrier symbols for ease of description. The multiple pairs provide time and frequency diversity. Examples of pairs of multi-carrier symbols pilot tones 211, 212, 213, 214, 215, 216, 217, 218 are depicted in the downlink frames 202, 204 of FIG. 2. Each of the different pairs of multi-carrier symbols includes at least one symbol having a different symbol index than the other of the pairs of multi-carrier symbols. The above-described first and second pairs of multi-carrier symbols can be any combinations of the multi-carrier symbol pairs that include the pilot tones 211, 212, 213, 214, 215, 216, 217, 218 as long as each selected pair has at least one symbol having a different multi-carrier symbol index than at least one multi-carrier symbol index of the other pair. Clearly, the pairs shown in FIG. 2 are merely examples. Any combination of pairs can be selected as long as at least one multi-carrier symbol of the first pair has a different symbol index than at least one multi-carrier symbol of the second pair.

An example of first and second pairs of multi-carrier symbols can be, for example, a first pair of multi-carrier symbols that includes the pilot tones 211 (symbols 1 and 4 of the first frame) and a second pair of multi-carrier symbols that includes the pilot tones 214 (symbols 2 and 5 of the first frame). Another example of first and second pairs of multi-carrier symbols can be, for example, a first pair of multi-carrier symbols that includes the pilot tones 211 (symbols 1 and 4 of the first frame) and a second pair of multi-carrier symbols that includes the pilot tones 217 (symbols 2 and 4 of the second frame).

An example pairs of multi-carrier symbols that do not qualify as first and second pairs includes, for example, the pair of multi-carrier symbols that include pilot tones 211, and the pair of multi-carrier symbols that include the pilot tones 215. The first pair includes multi-carrier symbols having symbol indices of 1 and 4 which are the same as the symbols indices of the proposed second pair. The proposed first pair is within a different frame and the proposed second pair, but the have the same multi-carrier symbol indices, and therefore, are not an acceptable selection for the described embodiments.

As described, a phase estimates can be determined by complex conjugate products between channel estimates of the multi-carrier symbols of each selected pair. The phase estimates provide approximation of the frequency offsets, and can be used to adjust a carrier frequency control loop of the subscriber (receiver).

Figure 3:
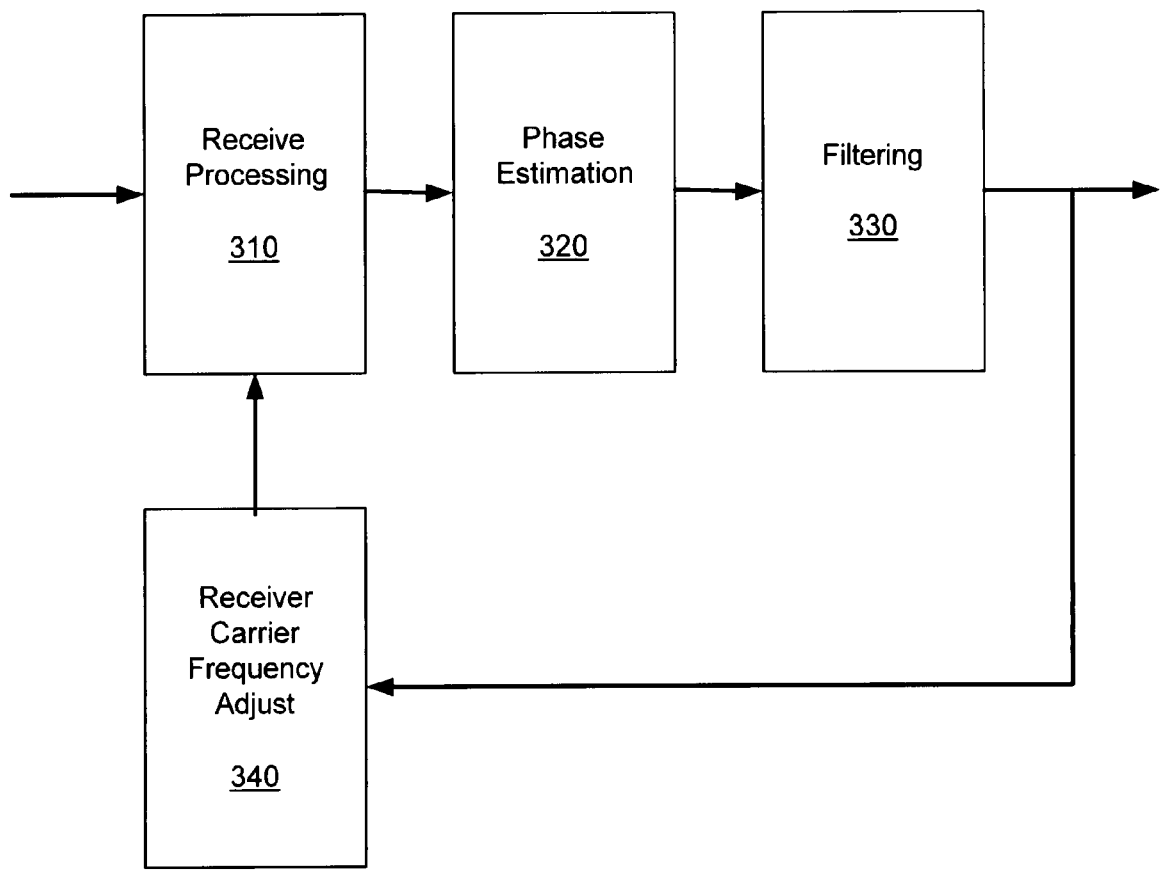
FIG. 3 is a block diagram of a carrier frequency adjust control loop of a receiver that utilizes pilot symbols of multiple pairs of pilot tones.

FIG. 3 is a block diagram of a carrier frequency adjust control loop of a receiver that utilizes pilot symbols of multiple pairs of pilot tones. The block diagram includes receiver processing 310, phase estimation processing 320, filtering 330 and receiver carrier frequency adjust 340. The described embodiments provide methods of estimating the phase in the phase estimation processing 320 which is filtered and fed back to the receiver carrier frequency adjust 340 for adjusting the carrier frequency of the receiver to reduce the frequency offset between the carrier frequency of the serving base station and the carrier frequency of the receiver (subscriber).

Figure 4A:
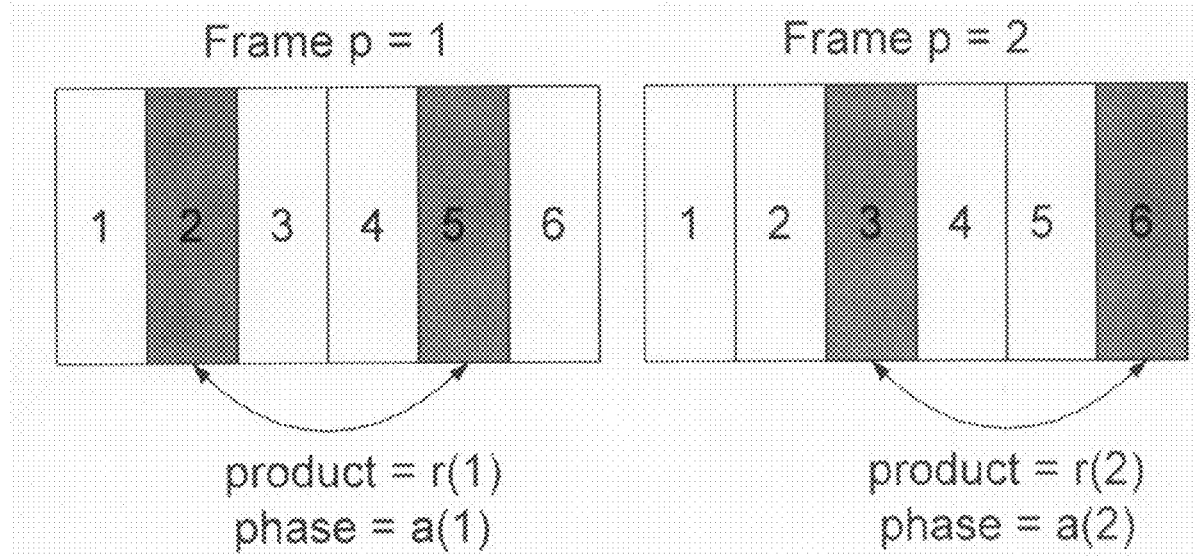
FIG. 4A shows another representation of a pair of downlink sub-frames and illustrates complex conjugate products between pilot symbols of pilot tones.

FIG. 4A shows another representation of a pair of downlink sub-frames and illustrates complex conjugate products between pilot symbols of pilot tones. That is, the first pair of multi-carrier symbols is from a first frame (Frame 1) and includes multi-carrier symbols having indices of 2 and 5. The second pair of multi-carrier symbols is from a second frame (Frame 2) and includes multi-carrier symbol having indices of 3 and 6. A first phase a(1) can be determined from a complex conjugate product r(1) between channel estimates of pilot tones of the first pair, and a second phase a(2) can be determined from a complex conjugate product r(2) between channel estimates of pilot tones of the second pair.

Figure 4B:
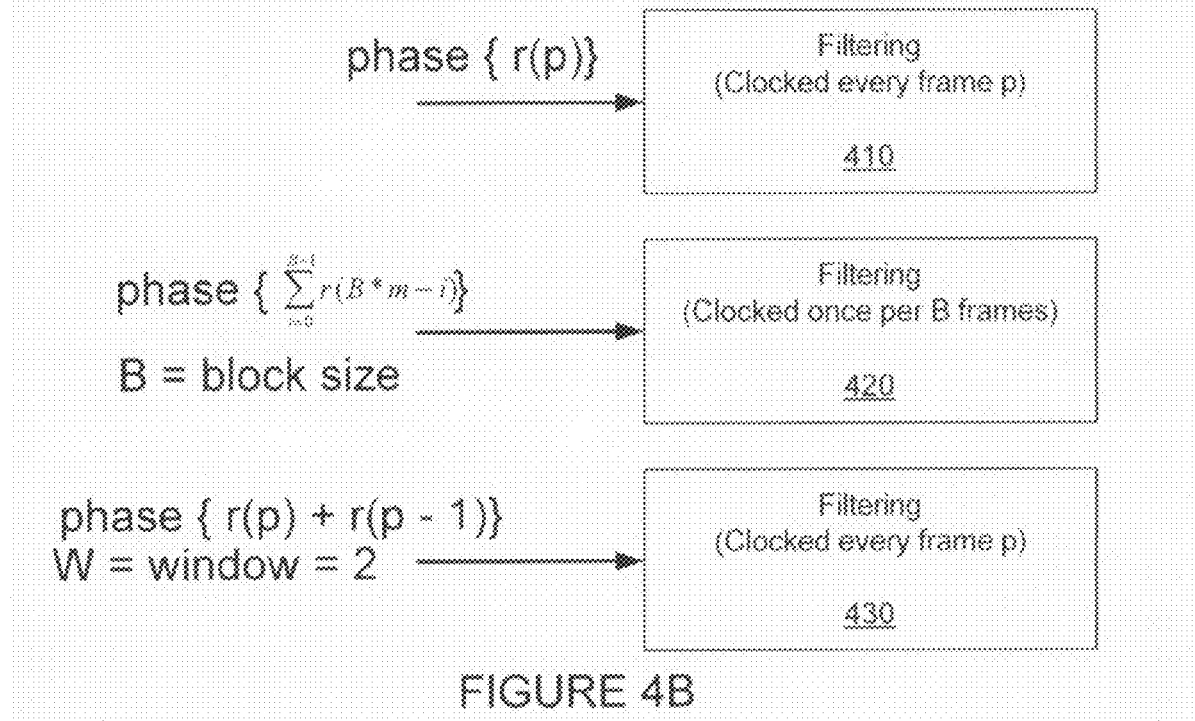
FIG. 4B shows three different methods of estimating a frequency offset and clocking the estimated frequency offset for adjusting a phase-locked loop of the carrier frequency of the receiver.

FIG. 4B shows three different methods of estimating a frequency offset and clocking the estimated frequency offset for adjusting a phase-locked loop of the carrier frequency of the receiver. A first filter configuration includes clocking a phase estimate into the filter 410 every frame p, in which a phase estimate for a single pair (for example, either the first pair of the second pair, and then the other of the first pair and the second pair the next frame) is estimated each frame p.

As second filter configuration includes clocking the phase estimate into the filter 420 once every block B frames, wherein the phase estimate is based on an average of the block B frames of phase estimates. A block index m is defined as the largest integer less than or equal to (p+1)/B. For example, if the block size B=2, then the filter is clocked every other frame, and the phase estimate is an average of two frames of phase estimates.

A third filter configuration includes clocking the phase estimate into the filter 430 once every frame, wherein the phase estimate is based on an average of frames (window) of phase estimates. For the third filter configuration shown, the window is equal to two.

Figure 5:
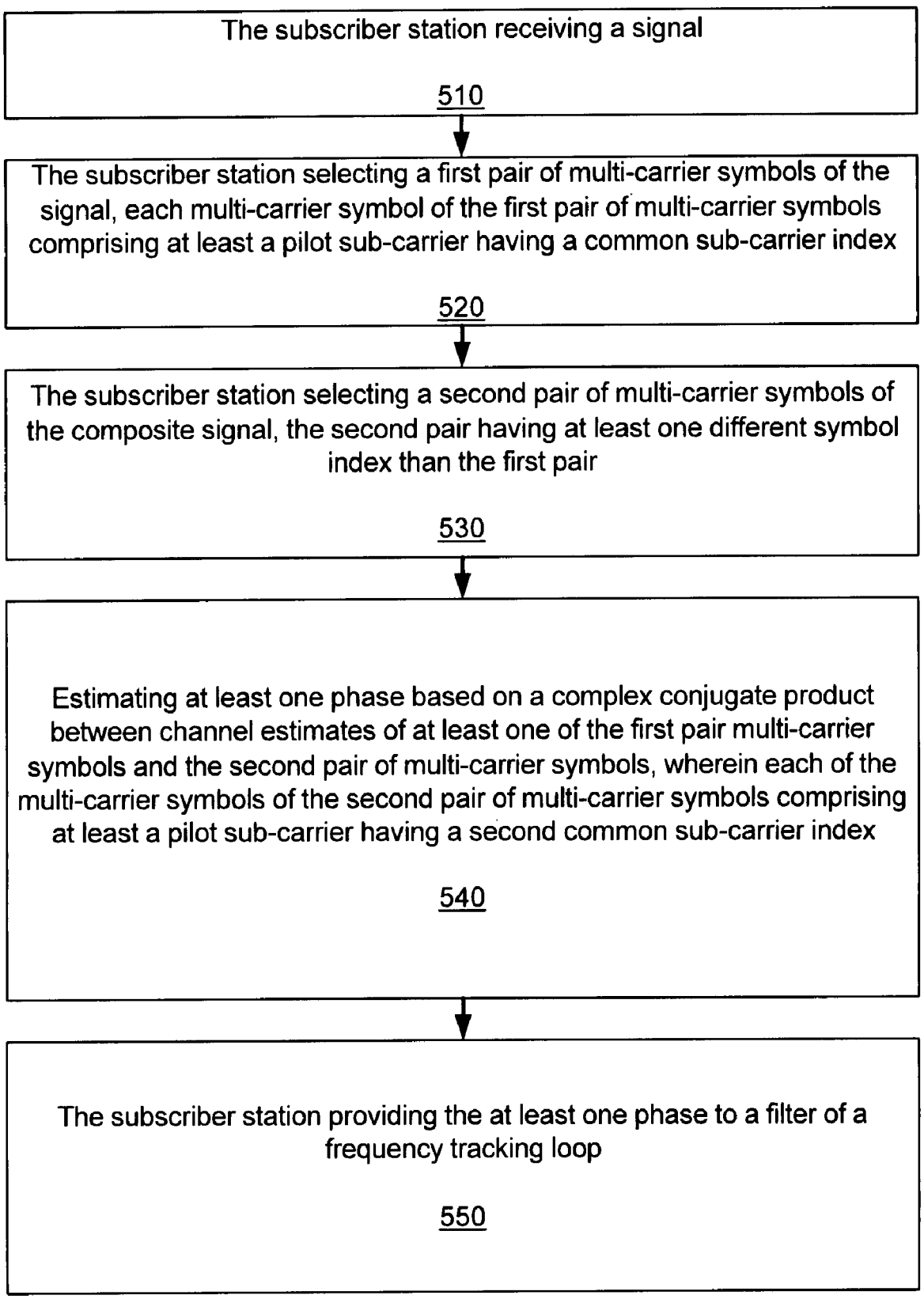
FIG. 5 is a flow chart that includes one example of steps of a method of estimating frequency offset at a subscriber station.

FIG. 5 is a flow chart that includes one example of steps of a method of estimating frequency offset at a subscriber station. A first step 510 includes the subscriber station receiving a signal. A second step 520 includes the subscriber station selecting a first pair of multi-carrier symbols of the signal, each multi-carrier symbol of the first pair of multi-carrier symbols comprising at least a pilot sub-carrier having a common sub-carrier index. A third step 530 includes the subscriber station selecting a second pair of multi-carrier symbols of the composite signal, the second pair having at least one different symbol index than the first pair. A fourth step 540 includes estimating at least one phase based on a complex conjugate product between channel estimates of at least one of the first pair multi-carrier symbols and the second pair of multi-carrier symbols, wherein each of the multi-carrier symbols of the second pair of multi-carrier symbols comprising at least a pilot sub-carrier having a second common sub-carrier index. A fifth step 550 includes the subscriber station providing the at least one phase to a filter of a frequency tracking loop.

An embodiment includes the channel estimates being frequency domain channel estimates. This embodiment further includes obtaining the frequency domain channel estimates by removing transmit pilot symbols of a serving base station from received symbols on the pilot sub-carriers. The subscriber station estimates at least one phase based on a first sum of complex conjugate products between frequency domain channel estimates on the pilot sub-carriers of the first pair of multi-carrier symbols, and based on a second sum of complex conjugate products between frequency domain channel estimates on the pilot sub-carriers of the second pair of multi-carrier symbols.

Another embodiment includes the channel estimates being time domain channel estimates. The subscriber station estimates at least one phase based on a first sum of complex conjugate products between taps of time domain channel estimates of the first pair of multi-carrier symbols, and based on a second sum of complex conjugate products between taps of time domain channel estimates of the second pair of multi-carrier symbols.

The signal received by the subscriber receiver can be a composite signal that includes multi-carrier signals transmitted from more than one base station. Generally, one of the multiple base stations is designated as a serving base station.

The phase can be determined for each of the identified multi-carrier pairs, or the phase can be determined based combinations of the identified multi-carrier pairs. The phase can be estimated by the previously described first sum, the second sum, or a combination of the first sum and the second sum.

An embodiment includes the first pair of multi-carrier symbols and the second pair of multi-carrier symbols being from a same (common) frame. For this embodiment, the phase can be determined from a combination of both first pair and the second pair, and the estimated phase is provided to the filter once every frame.

Another embodiment includes the first pair of multi-carrier symbols being from a first frame, and the second pair of multi-carrier symbols being from a second frame. For this embodiment, the phase can be provided either every frame, or a subset of every frame. That is, the phase determined from the first pair of multi-carrier symbols can be provided to the filter in one frame, and the phase determined from the second pair of multi-carrier symbols can be provided to the filter in another frame. Alternatively, the phases of the two pairs can be combined and provided to the filter every frame, or provided to the filter for less than every frame.

For an embodiment, the at least one phase includes obtaining a linear combination of complex conjugate products obtained across N frames, and is provided to the filter once every frame. For another embodiment, the at least one phase includes obtaining a linear combination of complex conjugate products obtained across N frames, determining the phase from the linear combination, and providing the phase to the filter once every N frames.

Another embodiment includes the subscriber station selecting a third pair of multi-carrier symbols of the composite signal, the third pair having different symbol indices than the first pair, but having a same symbol index separation, each of the multi-carrier symbols of the third pair of multi-carrier symbols comprising at least a pilot sub-carrier having a third common sub-carrier index.

Each of the pairs of multi-carrier symbols includes a symbol index separation. The symbol index separation of each of the multi-carrier symbols of each pair can be the same or different. One embodiment includes the symbol index separation of at least one of the first pair of multi-carrier symbols and the second pair of multi-carrier symbols being selected based upon a delay spread. One way of determining the delay spread includes observation of a channel impulse response. Another embodiment includes determining the symbol index separation of at least one of the first pair of multi-carrier symbols and the second pair of multi-carrier symbols based upon a maximal frequency offset. The separation in time between multi-carrier symbols of at least one of the first pair of multi-carrier symbols and the second pair of multi-carrier symbols can be inversely proportional to the Doppler spread.

The conversion from the phase estimate to the frequency offset estimate requires a scaling. If the separations of the first pair and the second pair are different, then the corresponding scale factor for each phase estimate to frequency offset estimate is different. The scale factor is different based on the separation or time difference between the pairs. It can be desirable to have a greater symbol separation because typically the greater the symbol separation, the better the SNR of the phase measurement. It can be desirable to have a smaller symbol separation because typically the smaller the symbol separation, the greater the measured maximal frequency offset range. Selecting the multi-carrier symbol separations of the first pair and second pair to be different can provide the advantages offered by both large and small separations between the multi-carrier symbols.

FIG. 6 is a flow chart that includes one example of steps of a method of estimating frequency offset at a subscriber station. A first step 610 includes the subscriber station receiving a composite signal, wherein the composite signal includes multi-carrier signals transmitted from a plurality of base stations. A second step 620 includes the subscriber station selecting a first pair of multi-carrier symbols of the composite signal, wherein each multi-carrier symbol of the first pair of multi-carrier symbols includes at least a pilot sub-carrier having a common sub-carrier index. That is, each multi-carrier symbols of the first pair of multi-carrier symbols includes one or more pilot sub-carrier that corresponds (has the same sub-carrier index) with a pilot sub-carrier of the other multi-carrier symbol of the first pair of multi-carrier symbols. A third step 630 includes the subscriber station selecting a second pair of multi-carrier symbols of the composite signal, the second pair having different symbol indices than the first pair, but having a same symbol index separation, each of the multi-carrier symbols of the second pair of multi-carrier symbols including at least a pilot sub-carrier having a second common sub-carrier index. A fourth step 640 includes the subscriber station estimating at least one phase based on a first sum of complex conjugate products between received symbols on the pilot sub-carriers of the first pair of multi-carrier symbols, and based on a second sum of complex conjugate products between received symbols on the pilot sub-carriers of the second pair of multi-carrier symbols. A fifth step 650 includes the subscriber station providing the phase to a filter of a frequency tracking loop.

The phase can be determined in several different ways. The phase can be determined for each of the first pair of multi-carrier symbols and the second pair of multi-carrier symbols, and the phase provided to the filter of the frequency tracking loop accordingly. That is, an embodiment includes the subscriber station obtaining a first phase based on a sum of complex conjugate products between received symbols on corresponding pilot sub-carriers of the multi-carrier symbols of the first pair of multi-carrier symbols, and the subscriber station providing the first phase to a filter of a frequency tracking loop. This embodiment further includes the subscriber station obtaining a second phase based on a sum of complex conjugate products between received symbols on corresponding pilot sub-carriers of the multi-carrier symbols of the second pair of multi-carrier symbols, and the subscriber station providing the second phase to the filter of the frequency tracking loop.

Alternatively, the phase can be determined by summing the complex conjugate products of each of the individual pairs of multi-carrier symbols. That is, the phase can be of a total sum, wherein the total sum includes the first sum and the second sum.

As previously described, the first pair of multi-carrier symbols and the second pair of multi-carrier symbols can be from the same frame, or the first pair of multi-carrier symbols can be from a first frame, and the second pair of multi-carrier symbols can be from a second frame. If the first pair and the second pair are from different frames, they two pairs can have the same symbols indexes. The number of pairs of multi-carrier symbols is not limited. That is, a third pair, a fourth pair, and so forth can additionally be used to determine the phase. Each of the pairs of multi-carrier symbols should have different symbol indices than the other pairs, but having a same symbol index separation as the other pairs.

The phase can be provided to the filter of the frequency tracking loop every frame, or less frequently than every frame. If provided every frame, the phase provided can be a running sum of a sum of complex conjugate products obtained across N frames is provided to the filter once every frame. If N=1, then a newly calculated phase if provided with every frame. If provided less than every frame, an embodiment includes estimating the phase from a block sum of a sum of complex conjugate products obtained across N frames, and the phase is provided to the filter once every N frames.

Although specific embodiments have been described and illustrated, the embodiments are not to be limited to the specific forms or arrangements of parts so described and illustrated.

What is claimed is:

1. A method of estimating frequency offset at a subscriber station, comprising:
   the subscriber station receiving a signal;
   the subscriber station selecting a first pair of multi-carrier symbols of the signal, each multi-carrier symbol of the first pair of multi-carrier symbols comprising at least a pilot sub-carrier;
   the subscriber station selecting a second pair of multi-carrier symbols of the composite signal, the second pair having at least one different symbol index than the first pair,
   estimating at least one phase based on a complex conjugate product between channel estimates of at least one of the first pair multi-carrier symbols and the second pair of multi-carrier symbols, wherein each of the multi-carrier symbols of the second pair of multi-carrier symbols comprising at least a pilot sub-carrier;
   the subscriber station providing the at least one phase to a filter of a frequency tracking loop.

2. The method of claim 1, wherein the channel estimates are frequency domain channel estimates, and the frequency domain channel estimates on pilot sub-carriers are obtained by removing transmit pilot symbols of a serving base station from received symbols on the pilot sub-carriers; and
   the subscriber station estimating at least one phase based on a first sum of complex conjugate products between frequency domain channel estimates on the pilot sub-carriers of the first pair of multi-carrier symbols, and based on a second sum of complex conjugate products between frequency domain channel estimates on the pilot sub-carriers of the second pair of multi-carrier symbols.

3. The method of claim 1, wherein the channel estimates are time domain channel estimates, and the subscriber station estimating at least one phase based on a first sum of complex conjugate products between taps of time domain channel estimates of the first pair of multi-carrier symbols, and based on a second sum of complex conjugate products between taps of time domain channel estimates of the second pair of multi-carrier symbols.

4. The method of claim 1, wherein the signal comprises a composite signal, the composite signal comprising multi-carrier signals transmitted from a plurality of base stations.

5. The method of claim 1, comprising:
   estimating a phase of a total sum, wherein the total sum comprises the first sum and the second sum.

6. The method of claim 1, wherein the first pair of multi-carrier symbols and the second pair of multi-carrier symbols are from a same frame.

7. The method of claim 6, wherein the phase is provided to the filter once every frame.

8. The method of claim 5, wherein the first pair of multi-carrier symbols is from a first frame, and the second pair of multi-carrier symbols is from a second frame.

9. The method of claim 8, wherein the at least one phase is provided to the filter once every frame of the composite signal.

10. The method of claim 1, wherein the at least one phase comprises obtaining a linear combination of complex conjugate products obtained across N frames is provided to the filter once every frame.

11. The method of claim 1, wherein estimating the at least one phase comprises obtaining a linear combination of complex conjugate products obtained across N frames, determining the at least one phase from the linear combination, and providing the phase to the filter once every N frames.

12. The method of claim 1, further comprising the subscriber station obtaining a first phase based on a sum of complex conjugate products between received symbols on corresponding pilot sub-carriers of the multi-carrier symbols of the first pair of multi-carrier symbols; and
    the subscriber station providing the first phase to a filter of a frequency tracking loop.

13. The method of claim 1, further comprising the subscriber station obtaining a second phase based on a sum of complex conjugate products between received symbols on corresponding pilot sub-carriers of the multi-carrier symbols of the second pair of multi-carrier symbols;
    the subscriber station providing the second phase to the filter of the frequency tracking loop.

14. The method of claim 1, further comprising:
    the subscriber station selecting a third pair of multi-carrier symbols of the composite signal, the third pair having different symbol indices than the first pair, each of the multi-carrier symbols of the third pair of multi-carrier symbols comprising at least a pilot sub-carrier having a third common sub-carrier index.

15. The method of claim 1, wherein a symbol index separation of at least one of the first pair of multi-carrier symbols and the second pair of multi-carrier symbols is selected based upon a delay spread.

16. The method of claim 1, wherein a symbol index separation of at least one of the first pair of multi-carrier symbols and the second pair of multi-carrier symbols is selected based upon a maximal frequency offset.

17. The method of claim 10, wherein a separation in time between multi-carrier symbols of at least one of the first pair of multi-carrier symbols and the second pair of multi-carrier symbols is inversely proportional to the Doppler spread.

18. The method of claim 1, further comprising the first pair of multi-carrier symbols and the second pair of multi-carrier symbols having a same symbol index separation.

19. The method of claim 1, wherein if a symbol index separation of the first pair of multi-carrier symbols is different than a symbol index separation of the second pair of multi-carrier symbols.

20. A method of estimating frequency offset at a subscriber station, comprising:
    the subscriber station receiving a composite signal, the composite signal comprising multi-carrier signals transmitted from a plurality of base stations;
    the subscriber station selecting a first pair of multi-carrier symbols of the composite signal, each multi-carrier symbol of the first pair of multi-carrier symbols comprising at least a pilot sub-carrier having a common sub-carrier index;
    the subscriber station selecting a second pair of multi-carrier symbols of the composite signal, the second pair having at least one different symbol index than the first pair, each of the multi-carrier symbols of the second pair of multi-carrier symbols comprising at least a pilot sub-carrier having a second common sub-carrier index;
    the subscriber station estimating at least one phase based on a first sum of complex conjugate products between received symbols on the pilot sub-carriers of the first pair of multi-carrier symbols, and based on a second sum of complex conjugate products between received symbols on the pilot sub-carriers of the second pair of multi-carrier symbols;

the subscriber station providing the phase to a filter of a frequency tracking loop.

21. The method of claim 20, comprising:

estimating a phase of a total sum, wherein the total sum comprises the first sum and the second sum.

22. The method of claim 20, wherein the first pair of multi-carrier symbols and the second pair of multi-carrier symbols are from a same frame.

23. The method of claim 22, wherein the phase is provided to the filter once every frame of the composite signal.

24. The method of claim 21, wherein the first pair of multi-carrier symbols is from a first frame, and the second pair of multi-carrier symbols is from a second frame.

25. The method of claim 24, wherein the at least one phase is provided to the filter once every frame of the composite signal.

26. A method of estimating frequency offset at a subscriber station, comprising:

the subscriber station receiving a signal;

the subscriber station selecting a first pair of multi-carrier symbols of the signal, each multi-carrier symbol of the first pair of multi-carrier symbols comprising at least a pilot sub-carrier having a common sub-carrier index;

the subscriber station selecting a second pair of multi-carrier symbols of the composite signal, the second pair having at least one different sub-carrier index than the first pair, and selected from a different frame;

estimating at least one phase based on a complex conjugate product between channel estimates of at least one of the first pair multi-carrier symbols and the second pair of multi-carrier symbols, wherein each of the multi-carrier symbols of the second pair of multi-carrier symbols comprising at least a pilot sub-carrier having a second common sub-carrier index, and wherein the channel estimates comprise at least one of time domain channel estimates and frequency domain channel estimates;

the subscriber station providing the at least one phase to a filter of a frequency tracking loop.

27. The method of claim 26, further comprising:

the second pair having at least one different symbol index than the first pair.

28. A subscriber station that receives a signal, comprising:

means for selecting a first pair of multi-carrier symbols of the signal, each multi-carrier symbol of the first pair of multi-carrier symbols comprising at least a pilot sub-carrier;

means for selecting a second pair of multi-carrier symbols of the composite signal, the second pair having at least one different symbol index than the fist pair, means for estimating at least one phase based on a complex conjugate product between channel estimates of at least one of the first pair multi-carrier symbols and the second pair of multi-carrier symbols, wherein each of the multi-carrier symbols of the second pair of multi-carrier symbols comprising at least a pilot sub-carrier;

means for providing the at least one phase to a filter of a frequency tracking loop.

* * * * *